United States Patent [19]

Pratt et al.

[11] 4,304,659
[45] Dec. 8, 1981

[54] METHOD FOR CONTROLLING REGENERATOR TEMPERATURE IN A FLUIDIZED CATALYTIC CRACKING PROCESS

[75] Inventors: Roy E. Pratt, Port Neches; William R. Menzies, III, Austin; Leonce F. Castagnos, Jr., Nederland, all of Tex.

[73] Assignee: Texaco, Inc., White Plains, N.Y.

[21] Appl. No.: 127,792

[22] Filed: Mar. 5, 1980

Related U.S. Application Data

[63] Continuation-in-part of Ser. No. 701,378, Jun. 30, 1976, abandoned, which is a continuation of Ser. No. 535,236, Dec. 23, 1974, abandoned.

[51] Int. Cl.$^3$ .............................................. C10G 11/18
[52] U.S. Cl. .................................... 208/164; 208/113; 208/120; 208/DIG. 1; 252/417; 252/419
[58] Field of Search ................ 208/DIG. 1, 120, 164, 208/113; 252/417, 419

[56] References Cited

U.S. PATENT DOCUMENTS

| | | | |
|---|---|---|---|
| 2,436,041 | 2/1948 | Gerhold et al. | 208/163 |
| 3,004,926 | 10/1961 | Goering | 208/164 X |
| 3,316,170 | 4/1967 | Stewart et al. | 208/164 |
| 3,679,576 | 7/1972 | McDonald | 208/74 |
| 3,909,392 | 9/1975 | Horecky et al. | 208/120 |
| 3,966,587 | 6/1976 | Bittensky et al. | 208/164 |
| 4,093,537 | 6/1978 | Gross et al. | 208/164 |
| 4,152,292 | 5/1979 | Conner et al. | 208/164 X |
| 4,160,743 | 7/1979 | Kelley | 208/164 X |

Primary Examiner—Delbert E. Gantz
Assistant Examiner—G. E. Schmitkons
Attorney, Agent, or Firm—Carl G. Ries; Robert A. Kulason; George J. Darsa

[57] ABSTRACT

An improved method for controlling the fluidized dense catalyst phase temperature in the regeneration zone of a fluid catalytic cracking unit. In this method, the level of the fluidized catalyst bed above the riser discharge in the reaction vessel is adjusted in response to a change detected in the temperature of the fluidized dense catalyst phase of the regeneration zone. Adjustment of the catalyst bed level in the reaction zone affects the coke laydown on the catalyst in the reactor and, consequently, the amount of heat liberated in the regeneration zone upon combustion of the coke contained in the partially deactivated catalyst. A reactor bed level is attained where the resulting coke laydown on the catalyst is sufficient to maintain the desired temperature in the fluidized dense catalyst phase. Also, as a part of this improved method, the amount of oxygen-containing regeneration gas supplied to the regeneration zone is adjusted to provide sufficient oxygen to effect substantially complete combustion of the coke to carbon dioxide and to maintain the oxygen content of the flue gas at a desired level within the range of from about 1 to about 10 mol %. Maintaining the oxygen content of the flue gas within this range provides a flue gas having a carbon monoxide content of from 0 to 500 ppm. The residence time of catalyst in the regeneration zone fluidized dense catalyst phase is adjusted to provide a regenerated catalyst with a low level of residual carbon-on-regenerated-catalyst.

8 Claims, 1 Drawing Figure

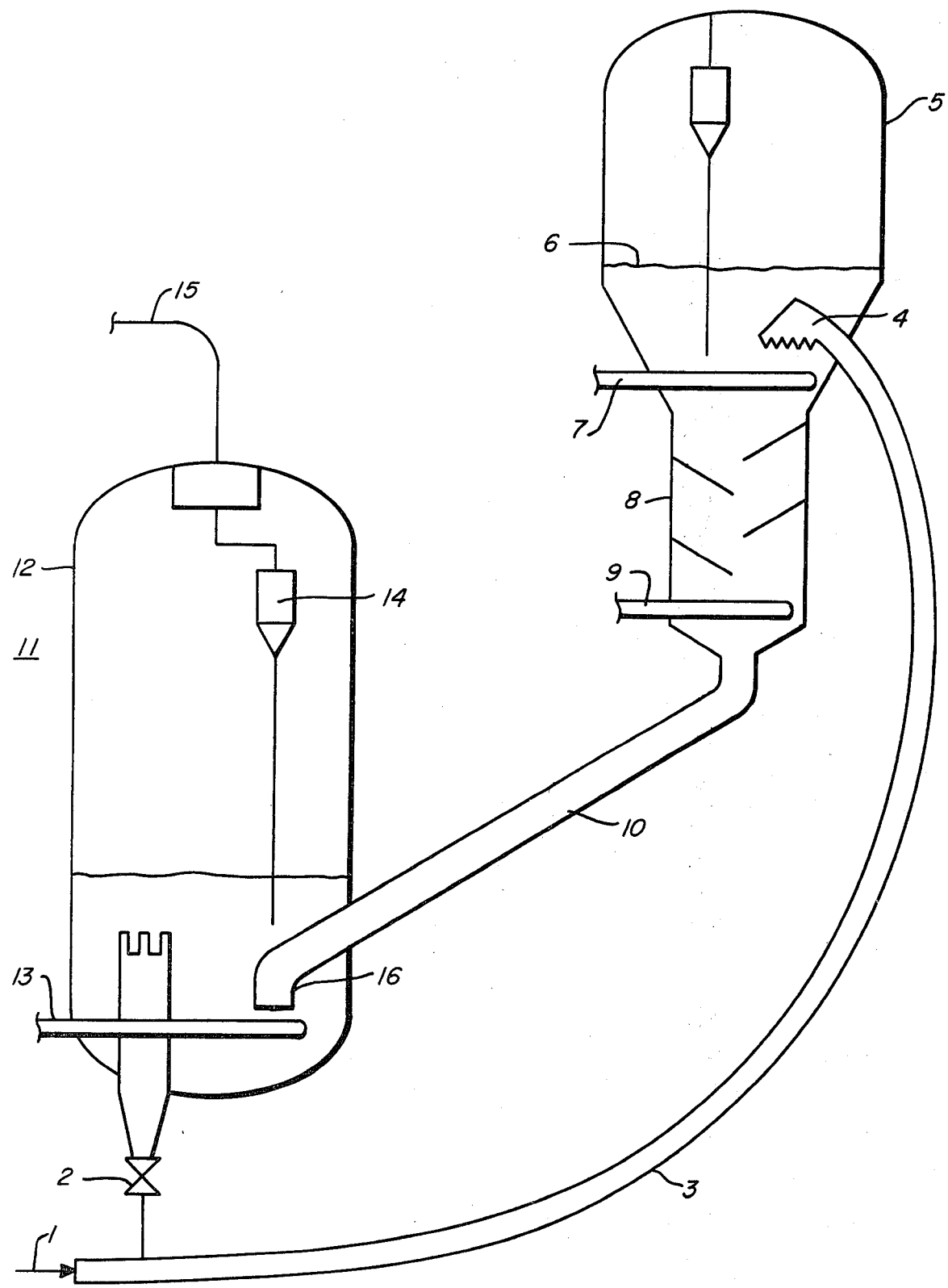

METHOD FOR CONTROLLING REGENERATOR TEMPERATURE IN A FLUIDIZED CATALYTIC CRACKING PROCESS

This application is a continuation-in-part of U.S. patent application Ser. No. 701,378, filed June 30, 1976, now abandoned, which, in turn, is a continuation of U.S. patent application Ser. No. 535,236, filed Dec. 23, 1974, now abandoned.

BACKGROUND OF THE INVENTION

This invention relates to an improved process for controlling the temperature in the regeneration zone in a fluid catalytic cracking process. In particular, it is related to a method of controlling the temperature in the fluidized dense catalyst phase of the regenerator of a fluid catalytic cracking unit (FCCU) having a single fluidized dense catalyst phase wherein coke-contaminated fluidizable catalytic cracking catalyst is contacted with an oxygen-containing regeneration gas in order to obtain a regenerated catalyst having a low carbon content.

The fluidized catalytic cracking of hydrocarbons is well-known in the prior art and may be accomplished using a variety of continuous cyclic processes which employ fluidized solids techniques. In such fluid catalytic cracking processes hydrocarbons are converted under conditions such that substantial portions of a hydrocarbon feed are transformed into desirable products such as gasoline, liquified petroleum gas, alkylation feedstocks and middle distillate blending stocks with concomitant by-product formation of an undesirable nature, such as gas and coke. When substantial amounts of coke deposition occur, reduction in catalyst activity and, particularly, catalyst selectivity results thereby deterring hydrocarbon conversion, reducing gasoline production and simultaneously increasing the production of less desired products. To overcome such catalyst deactivation through coke deposition, the catalyst is normally withdrawn from the reaction zone and passed to a stripping zone wherein entrained and absorbed hydrocarbons are initially displaced from the catalyst by means of stripping medium such as steam. The steam and hydrocarbons are removed and the stripped catalyst is passed to a regeneration zone where it is contacted with an oxygen-containing gas to effect combustion of at least a portion of the coke and thereby regenerate the catalyst. Thereafter, the regenerated catalyst is reintroduced to the reaction zone and therein contacted with additional hydrocarbons.

Generally, regeneration processes provide a regeneration zone wherein the coke-contaminated catalyst is contacted with sufficient oxygen-containing regeneration gas at an elevated temperature to effect combustion of the coke deposits from the catalyst. Most common of the regeneration processes are those wherein the contacting is effected in a fluidized dense catalyst phase in a lower portion of the regeneration zone constituted by passing the oxygen-containing regeneration gas upwardly through the regeneration zone. The space above the fluidized dense catalyst phase contains partially spent regeneration gases and catalyst entrained by the upward flowing regeneration gas. This portion of the regeneration zone is generally referred to as the dilute catalyst phase. The catalyst entrained in the dilute catalyst phase is recovered by gas solid separation cyclones located in the upper portions of the regeneration zone and is returned to the fluidized dense catalyst phase. Flue gas comprising carbon monoxide, other by-product gases obtained from the combustion of the coke deposits, inert gases such as nitrogen and any unconverted oxygen is recovered from the upper portion of the regeneration zone and a catalyst of reduced carbon content is recovered from a lower portion of the regeneration zone.

In the regeneration of catalytic cracking catalyst, particularly high activity molecular seive type cracking catalysts, it is desirable to burn a substantial amount of coke from the catalyst such that the residual carbon content of the regenerated catalyst is very low. A carbon-on-regenerated-catalyst content of about 0.15 weight percent or less is desirable. Cracking catalysts with such a reduced carbon content enable higher conversion levels within the reaction zone of the FCC unit and improved selectivity to gasoline and other desirable hydrocarbon products.

In the regeneration of catalytic cracking catalyst it is also desirable to operate the regeneration zone under conditions such that the flue gas leaving the regeneration zone have a carbon monoxide concentration of approximately 500 ppm or less so that the flue gas may be discharged into the atmosphere without additional treatment.

In order to obtain low carbon-on-regenerated-catalyst contents of about 0.15 wt.% or less, and a regeneration flue gas having a low carbon monoxide content, it is necessary to operate the fluidized dense catalyst phase of the regeneration zone at a temperature of from about 1275° F. to about 1450° F. and provide oxygen-containing regeneration gas in an amount sufficient to effect combustion of the coke to carbon dioxide and to provide from about 1 to about 10 mol% oxygen in the flue gas in order to reduce the carbon monoxide concentration in the flue gas to the levels herein indicated.

Whenever a regenerator is operated within the range of operating conditions herein described, it is important to control the temperature of the fluidized dense catalyst phase in the regenerator in order to maintain the desired operating conditions in the reaction zone and in order to avoid an uncontrolled afterburn in the dilute catalyst phase of the regeneration zone.

By after-burning is meant the further oxidation of carbon monoxide to carbon dioxide in the dilute catalyst phase. Whenever after-burning occurs in the dilute catalyst phase, it is generally accompanied by a substantial increase in the temperature due to the large quantities of heat liberated. In such circumstances, the dilute phase temperature may exceed about 1500° F. and, in severe cases, may increase to about 1800° F. or higher. Such high temperatures in the dilute catalyst phase are deleterious to the entrained catalyst present in the dilute catalyst phase and result in a permanent loss of catalytic activity, thus necessitating an inordinately high rate of catalyst addition or replacement to the process in order to maintain a desired level of catalytic activity in the hydrocarbon reaction zone. Such high temperatures are additionally undesirable because of the damage which may result to the mechanical components of the regeneration zone, particularly to cyclone separators employed to separate the entrained catalyst from the flue gas.

It is known that commonly employed catalytic cracking catalysts such as amorphous silica-alumina, silica-alumina zeolitic molecular sieves, silica-alumina zeolitic molecular sieves ion-exchanged with divalent metal ions, rare earth metal ions, etc., and mixtures thereof, are adversely affected by exposure to excessively high temperatures. At temperatures of approximately 1500° F. and higher, the structure of such catalytic cracking catalyst undergo physical change, usually observeable as a reduction in the surface area with resulting substantial decrease in catalytic activity. Consequently, it is desirable to maintain the temperatures within the regeneration zone at levels below which there is any substantial physical damage to the catalyst.

Known methods for controlling the temperature of the fluidized dense catalyst phase of the regeneration zone generally include the following: adjusting the pre-heat of the oxygen-containing regeneration gas to the regeneration zone; removing heat from the fluidized dense catalyst phase by direct or indirect heat-exchange with a suitable heat-exchange medium; adjusting the oxygen-containing regeneration gas rate to control the combustion of coke within the fluidized dense catalyst phase; and adjusting the conversion level within the reaction zone of the FCCU in order to adjust the coke laydown on the spent catalyst being regenerated. All of these methods are unsatisfactory in that none provides for a method of controlling the temperature within the fluidized dense catalyst phase of the regeneration zone without requiring additional heat-exchange provisions or flue gas treatment facilities for control of carbon monoxide content while maintaining the conversion level within the reaction zone at the desired levels.

SUMMARY OF THE INVENTION

Now, according to the present invention, an improved method for controlling the temperature of the fluidized dense catalyst phase of the regeneration zone of a fluidized catalytic cracking process has been discovered whereby a regenerated catalyst having a low residual carbon content of about 0.15 wt.% or less is obtained and wherein the carbon monoxide content of the flue gas from the regeneration process may be maintained at about 500 ppm or less, and preferably 10 ppm or less.

The process of the present invention for a fluid catalytic cracking unit comprising a riser transport reaction zone discharging into a reaction vessel wherein a fluidized bed of catalyst is maintained, comprises the step of adjusting the level of the fluidized catalyst bed above the riser discharge in the reaction zone in response to a change detected from the control temperature in the fluidized dense catalyst phase of the regeneration zone, and adjusting the amount of oxygen-containing regeneration gas introduced into the regeneration zone in response to a change detected from the control concentration of the oxygen concentration in the regeneration flue gas. Adjustment of the level of the fluidized catalyst bed in the reaction zone will alter the weight hourly space velocity (lb. oil/hr./lb. catalyst) above the riser discharging into the reaction vessel, and consequently the coke laydown, thereby adjusting the amount of heat provided by combustion of the coke deposits in the fluidized dense catalyst phase of the regeneration zone. In this manner, the temperature of the fluidized dense catalyst phase is returned to the desired control temperature.

As the coke laydown is altered, the oxygen concentration in the regeneration flue gas is thereby changed. Therefore, an adjustment is necessary in the flow rate of the oxygen-containing regeneration gas in order to return the oxygen concentration of the regeneration flue gas to the control concentration. In the process of this invention, the oxygen concentration of the regeneration flue gas is controlled at a concentration within the range of from about 1 to about 10 mol%, and preferably in the range of from about 2 to about 5 mol%. Maintaining the control oxygen concentration of the flue gas within this range provides a flue gas having a carbon monoxide concentration of from about 0 to 500 ppm. The residence time of the catalyst in the fluidized dense catalyst phase is adjusted to maintain a catalyst residence time in the range of from about 3 to about 10 minutes to provide a regenerated catalyst with a low level of residual carbon-on-regenerated-catalyst.

BRIEF DESCRIPTION OF THE DRAWING

The FIGURE of the drawing is a schematic representation of a fluidized catalytic cracking process employing the improvements of the present invention.

DETAILED DESCRIPTION OF THE INVENTION

According to the process of this invention, a fluidizable catalytic cracking catalyst which has been partially deactivated by the deposition of carbonaceous deposits upon the surface thereof (hereinafter referred to as coke-contaminated catalyst) in a fluidized catalytic cracking process is introduced into a fluidized dense catalyst phase of a regeneration zone wherein it is contacted with an oxygen-containing regeneration gas for the purpose of burning the carbonaceous deposits from the catalyst thereby to restore its activity. The regeneration zone generally comprises a regeneration vessel, in which there is a fluidized dense catalyst phase in the lower portion thereof and a dilute catalyst phase in the upper portion thereof. The oxygen-containing regeneration gas is introduced into the lower portion of the regeneration zone thereby to maintain the catalyst in a fluidized dense catalyst state. A flue gas is recovered from the top of the regeneration zone comprising carbon monoxide and other by-products of the combustion of the coke deposits contained on the coke-contaminated catalyst.

The fluidized dense catalyst phase is generally maintained at a density of from about 10 to about 60 lb/ft$^3$ and preferably at a density of from about 20 to about 40 lb/ft$^3$ by the upward flow of the oxygen-containing regeneration gas, which is introduced at a lower portion in the regeneration zone. The catalyst in the lower portion of the regeneration zone is maintained in a fluidized dense catalyst phase in order to obtain good head transfer throughout the bed and to avoid localized hot spots and their concomitant high temperatures, which are known to adversely affect the catalyst. In order to maintain the catalyst in a fluidized state, a specific vapor velocity of the regeneration gas of from about 0.2 to about 6.0 ft./sec. is generally maintained. The regeneration vessel is generally sized to provide a specific vapor velocity within the aforementioned ranged when operating with the desired residence time for the catalyst in the regeneration zone and with the required amount of oxygen-containing regeneration gas to effect the combustion of the coke from the catalyst in the reaction zone. Additionally, it is possible to control the specific vapor velocity within the desired range by employing an operating pressure within the regeneration zone within the range of from about 1 to about 50 psig, and preferably from about 15 to about 45 psig. If, within these operating parameters, there is nevertheless insufficient oxygen-containing regeneration gas to provide the desired specific vapor velocities, steam or an inert diluent gas may be combined with the oxygen-containing regeneration gas to provide the desired specific vapor velocity.

In order to operate the regenerator such that the flue gas contains carbon monoxide in an amount of about 500 ppm or less and does not require additional treatment prior to discharge into the atmosphere, it is necessary to maintain the fluidized dense catalyst phase of the regeneration zone at a temperature in the range of from about 1275° F. to about 1450° F. At a fluidized dense catalyst phase temperature in the range of from about 1350° F. to about 1450° F., and preferably within the range of about 1375° F. to about 1450° F., and sufficient volume of fluidized dense catalyst phase to provide a catalyst residence time within the fluidized dense catalyst phase of from about 3 to about 10 minutes, coke is burned from the partially deactivated coke-contaminated catalyst in a manner such that all of the carbon monoxide formed in the combustion process is converted to carbon dioxide in the fluidized dense catalyst phase. Therefore, operating the regenerator fluidized dense catalyst phase within these temperatures avoids after-burning in the dilute catalyst phase. Operating the regenerator with a fluidized dense catalyst phase at a temperature in the range of from about 1275° F. to about 1350° F., and preferably in the range of from about 1300° F. to about 1350° F., and with a catalyst residence time of from about 3 to about 10 minutes in the fluidized dense catalyst phase, the combustion of coke from the partially deactivated catalyst is effected such that there is a controlled afterburn of carbon monoxide in the dilute catalyst phase. By controlled afterburn is meant effecting combustion of the coke from the partially spent catalyst in the fluidized dense phase of the regeneration zone such that the combustion of carbon monoxide to carbon dioxide is initiated in the fluidized dense catalyst phase and is completed in the dilute catalyst phase with only a moderate increase in temperature, such that the temperature in the dilute catalyst phase of the regeneration zone does not exceed about 1455° F. This controlled afterburn is accomplished by controlling the amount of carbon monoxide in the regeneration gases leaving the fluidized dense catalyst phase such that the temperature in the dilute catalyst phase is in the range of from about 1375° F. to about 1455° F., and preferably from about 1400° F. to about 1455° F.

In view of environmental considerations, it is important that the concentration of carbon monoxide, which is known to be a severe air pollutant, be maintained at as low a level as possible in the regeneration flue gas. In the process of this invention, carbon monoxide concentrations in the regeneration flue gas may be maintained at 500 ppm or less, and generally at 10 ppm or less, without additional treatment of the regeneration flue gas.

In the process of this invention, wherein the fluidized catalytic cracking process comprises a riser transport reaction zone discharging into a reaction vessel wherein a fluidized dense catalyst bed is maintained, the temperature of the fluidized catalyst phase of the regeneration zone is controlled at a set temperature in the range hereindescribed by adjusting the level of the fluidized catalyst bed above the riser discharge into the reaction vessel in response to a detected change in the fluidized dense catalyst phase temperature. For example, if the temperature of the fluidized dense catalyst phase increases from the set point, the level of the fluidized catalyst bed above the riser in the reaction zone is decreased by an amount such that the reduction in coke laydown which occurs in the reaction zone due to the resulting higher weight hourly space velocity is sufficient to return the temperature of the fluidized dense catalyst phase to the set temperature. Correspondingly, if a decrease in temperature of the fluidized dense catalyst phase is detected, the level of the fluidized catalyst bed above the riser in the reaction zone is increased by an amount such that the resulting increased coke laydown on the catalyst will, upon combustion within the fluidized dense catalyst phase of the regeneration zone, provide additional heat to return the temperature of the fluidized dense catalyst phase to the set temperature.

The level of the fluidized catalyst bed above the riser in the reaction vessel is adjusted by regulation of the amount of partially deactivated catalyst which is being continuously withdrawn from the lower portion of the reaction vessel and transferred to the regeneration zone. Under normal operating conditions, the fluidized catalyst bed depth above the riser in the reaction vessel is maintained at a set level by adjusting as necessary the rate at which the partially deactivated catalyst is removed from the reaction vessel. In the process of this invention, the fluidized catalyst bed level in the reaction vessel is adjusted in response to the detected change in temperature in the fluidized dense catalyst phase as hereinbefore described. This is accomplished by resetting the set point at which the fluidized catalyst bed is maintained in the reaction vessel in response to the detected change in temperature in the fluidized dense catalyst phase of the regeneration zone.

The amount of oxygen-containing regeneration gas necessary in the practice of the process of this invention will depend upon the amount of coke contamination on the catalyst being introduced into the regeneration zone. Generally, oxygen is provided in an amount sufficient to effect the substantially complete combustion of coke from the catalyst and to provide an oxygen concentration in the flue gas from the regeneration zone of from about 1 to about 10 mol%, and preferably from about 2 to about 5 mol%.

As the level of the fluidized catalyst bed in the reaction vessel is changed for the purpose of controlling the temperature of the fluidized dense catalyst phase of the regeneration zone, a corresponding change will occur in the oxygen concentration in the regeneration flue gas. Therefore, in accordance with this invention, the flow rate of the oxygen-containing regeneration gas to the regeneration zone is adjusted in response to the detected change in the oxygen content of the regeneration flue gas. Thus, as the fluidized catalyst bed depth in the reaction vessel is increased, the amount of coke laydown on the catalyst in the reaction zone will increase and there will be a corresponding decrease in the oxygen concentration of the regeneration flue gas. Therefore, the oxygen-containing regeneration gas rate to the regeneration zone will be increased by an amount such that the oxygen concentration in the flue gas is returned to the controlled concentration. Similarly, a decrease in the fluidized catalyst bed depth in the reaction vessel will result in a reduction in the flow rate at which the oxygen-containing regeneration gas is supplied to the regeneration zone. The reduction in flow rate will be in response to the detected increase in the oxygen concentration of the regeneration flue gas and will be in an amount such that the oxygen concentration of the flue gas is returned to the controlled concentration.

The oxygen-containing regeneration gas which may be employed in practicing the process of this invention includes gases which contain molecular oxygen in admixture with other inert gases. Air is a particularly suitable regeneration gas. Additional gases which may be employed include oxygen in combination with carbon dioxide and/or other inert gases. Additionally, if desirable, steam may be added as a part of the regeneration gas mixture.

In practicing the method of the present invention to obtain a regenerated catalyst having a carbon-on-regenerated-catalyst content of about 0.15 weight percent or less, it is necessary to maintain the coke-contaminated catalyst in the fluidized dense catalyst phase at the aforementioned conditions for a period of from about 3 to about 10 minutes. Of course, longer residence times may be employed, although generally there is no advantage in so doing. It is an advantage of the process of the present invention that catalyst residence times in the regeneration zone may be substantially decreased over residence times employed in other prior art processes. Thus, it is possible to operate the process of this invention at a substantially reduced catalyst inventory within the fluidized catalytic cracking unit. The residence time of the catalyst within the fluidized dense catalyst phase is maintained at the desired level by adjustment of the depth of the fluidized dense catalyst phase within the regeneration zone.

In addition to providing an improved method for controlling the temperature of the fluidized dense catalyst phase of the regeneration zone at a desired set temperature as hereindescribed, the process of this invention provides a convenient way to make changes in the temperature of the fluidized dense catalyst phase of the regeneration zone. For example, a change may be made in the control temperature, or set point, of the fluidized dense catalyst phase and the fluidized bed depth in the reaction vessel and the oxygen-containing regeneration gas rate will be adjusted accordingly to maintain the control oxygen concentration and the new control temperature in the fluidized dense catalyst phase.

This invention will now be further illustrated in the following example in conjunction with the drawings which are not to be considered as limitations on the scope of the invention.

EXAMPLE I

A continuous fluidized catalytic cracking process was operated in a pilot unit for demonstrating the present invention. The fluidized catalytic cracking process is described in this example in conjunction with the attached drawing which comprises a schematic diagram of a fluidized catalytic process employing the improvements of the present invention. With reference to the drawing, hydrocarbon charge from line 1 and fresh regenerated catalyst from regenerated catalyst standpipe 2 were combined in the lower portion of riser transport reactor 3 and wherein catalyst and hydrocarbon vapor discharged from the top discharge 4 of said riser 3 into reaction vessel 5. In reaction vessel 5, hydrocarbon vapor disengaged from the used cracking catalyst and the cracking catalyst was maintained as a fluidized bed, with a level 6 above the riser discharge 4 to result in a desired weight hourly space velocity (WHSV) above riser discharge 4. The fluidized bed was maintained in reaction vessel 5 zone by the action of primary stripping steam introduced into reaction vessel 5 via steam sparger 7 below riser discharge 4. From reaction vessel 5 used catalyst was continuously withdrawn into stripping section 8 wherein strippable hydrocarbon vapors were removed from the catalyst by the stripping action of steam from steam line 9. From stripping section 8, used catalyst was continuously transferred via used catalyst conduit 10 into regeneration vessel 11. Regeneration vessel 11 comprised an upright cylindrical vessel 12 having catalyst inlet nozzle 16 for introducing used catalyst continuously thereto, regenerated catalyst standpipe 2 for withdrawing regenerated catalyst, regeneration gas sparger 13 near the bottom for the introduction of oxygen-containing regeneration gas, e.g., air, cyclone separator 14 near the top of vessel 12 for the separation of catalyst from the flue gas resulting from the regeneration of the catalyst, and vent pipe 15 for removing flue gas from vessel 12. Regeneration vessel 11 was equipped with valves, piping, thermocouples, pressure gauges, sample taps and flow measuring devices necessary to obtain the data shown in this example. In this example, partially deactivated catalyst from reaction vessel 5, stripped in stripping vessel 8, at a temperature of about 950° F. was continuously added via used catalyst conduit 10 to regeneration vessel 11 through catalyst entry nozzle 16. In regeneration vessel 11, the catalyst was maintained in a fluidized dense catalyst phase by the upward flowing oxygen-containing regeneration gas introduced into the lower portion of regeneration zone vessel 11 via regeneration gas sparger 13.

Catalyst employed in the runs of this example was an ion-exchanged silica-alumina zeolitic molecular sieve catalyst as manufactured by Davison Chemical Co. under the tradename "CBZ-1." Equilibrium catalyst obtained from a commercial FCCU was employed at start-up of the FCCU, and fresh catalyst was added on a regular basis to maintain equilibrium activity.

Analyses of the flue gas from vent line 15 for residual carbon monoxide content were made at different operating conditions.

In the various runs of this example, the fluidized catalytic cracking unit (FCCU) was operated with excess oxygen-containing regeneration gas and fluidized dense catalyst phase temperatures in regeneration vessel 11 sufficiently high to produce a flue gas in vent line 15 with a carbon monoxide concentration of about 500 ppm or less, and preferably 10 ppm or less, and a regenerated catalyst in regenerated catalyst standpipe 2 with a carbon-on-regenerated-catalyst (CORC) content of approximately 0.12 weight percent or less. In the four runs, the data for which are presented in the following Tables 1, 2A and 2B, the FCCU cracking runs were made on a once through gas-oil charge basis at a constant charge rate via line 1. Reactor vessel 5 operating conditions (riser discharge 4 temperature and conversion levels) were maintained at a relatively constant level. The purpose of the four runs was to demonstrate that a fluidized dense catalyst phase temperature in regeneration vessel 11 could be maintained at a desired level by adjustment of the fluidized catalyst bed depth above riser discharge 4 in reaction vessel 5. In these runs, regeneration vessel 5 fluidized dense catalyst phase temperatures of from 1304° F. to 1423° F. were established and maintained by adjustment of the catalyst bed level 6 in reaction vessel 5 to adjust the weight hourly spaced velocity (WHSV) above the discharge 4 in reaction vessel 5 between 2.34 and 1.82 lb. oil/hr./lb. catalyst. During these runs, the oxygen-containing regeneration gas flow rate from regeneration gas sparger 13 was adjusted to maintain sufficient oxygen to effect combustion of the coke deposits on the partially deactivated catalyst and to provide excess oxygen in the regeneration flue gas from vent line 15 in the amounts indicated.

Charge stock employed in this experiment was a refinery virgin gas-oil FCCU charge. Properties of this charge stock are shown in Table 1, following.

about 2 mol% to about 5 mol%, there is produced a regenerated catalyst in regenerated catalyst standpipe 2 with a reduced CORC content and a flue gas from vent line 15 having a carbon monoxide content of 500 ppm or less and preferably 10 ppm or less. A further advantage of this method of controlling the fluidized dense catalyst phase temperature in regeneration vessel 11 resides in the fact that conversion levels may be maintained at relatively constant levels while temperature changes are being effected as desired in the fluidized dense catalyst phase of regeneration vessel 11.

TABLE 2A

FCCU OPERATING CONDITIONS AND YIELDS (REACTOR SECTION)

| Run No. | Reactor Charge Rate ltr/hr. | REACTOR RISER Temp., °F. In | REACTOR RISER Temp., °F. Out | Space Velocity vol oil/hr/ Vol Riser | Reactor WHSV above Riser lb. oil/hr./ lb. Cat. | Cat./Oil Ratio lb./lb. | Gas Oil Conv. Vol. % | Coke Yield wt. % Gas Oil | D.B. Naphtha Yield Vol. % | D.B. Naphtha Octane RON (0) |
|---|---|---|---|---|---|---|---|---|---|---|
| 2616-J | 29.01 | 697 | 962 | 5.05 | 2.34 | 6.6 | 78.89 | 6.75 | 68 | 90.0 |
| 2616-G2 | 29.25 | 699 | 964 | 5.10 | 1.87 | 6.9 | 79.39 | 7.28 | 63 | 91.1 |
| 2616-B8 | 28.78 | 697 | 960 | 5.01 | 1.82 | 7.6 | 77.68 | 7.42 | 51.7 | — |
| 2616-B14 | 28.78 | 696 | 964 | 5.02 | 1.82 | 5.9 | 79.09 | 6.95 | 52.3 | 92.4 |

TABLE 2B

FCCU OPERATING CONDITIONS AND YIELDS (REGENERATION SECTION)

| Run No. | Dense Phase Temp., °F. | Dilute Phase Temp., °F. | Afterburn °F. | Coke Yield wt. % CHG. | Coke Burned wt. % Catalyst Cine. | Flue Gas Analysis Mole % (CRSAT) $O_2$ | Flue Gas Analysis Mole % (CRSAT) $CO_2$ | Flue Gas Analysis Mole % (CRSAT) CO | Flue Gas Analysis Mole % (CRSAT) CO* |
|---|---|---|---|---|---|---|---|---|---|
| 2616-J | 1304 | 1455 | 151 | 6.75 | 1.02 | 5.53 | 11.93 | 0.20 | <500 ppm |
| 2616-G2 | 1349 | 1417 | 68 | 7.28 | 1.06 | 4.67 | 12.13 | 0.13 | <500 ppm |
| 2616-B8 | 1379 | — | — | 7.42 | 0.98 | 1.4 | 16.0 | — | <500 ppm |
| 2616-B14 | 1423 | — | — | 6.95 | 1.18 | 5.17 | 12.3 | 0.2 | <500 ppm |

*Check samples indicate that ORSAT analysis showing CO concentrations of about 0.4 vol. % and less are highly inaccurate compared to check samples run by a MSA-CO detector and gas chromatograph. The check samples indicate, the CO concentration in the flue gas was in the range of 0-500 ppm.

TABLE 1

| CHARGE STOCK EVALUATION | |
|---|---|
| Description | FCCU GAS-OIL FEED |
| Gravity, °API | 29.5 |
| Aniline Point, °F. | 180.5 |
| Sulfur, X-Ray wt. % | 0.41 |
| ASTM Distillation, °F. | |
| IBP/5 | 334/— |
| 10/20 | 540/584 |
| 30/40 | 611/638 |
| 50 | 658 |
| Conradson Carbon Residue, wt. % | 0.19 |
| Acromatics, wt. % | 40.2 |
| Ring Index at 25° C. | 1.486 |
| Basic Nitrogen, wppm | 199 |
| Total Nitrogen, wppm | 329 |
| Viscosity, centistokes at 100° F. | +80 |
| UV Absorbance at 285 m. | 4.41 |
| Pentane Insolubles, wt. % | 0.07 |

The data presented in Tables 2A and 2B demonstrate the advantage of the method of this invention for controlling the temperature of the fluidized dense catalyst phase of regeneration vessel 11. By adjusting the fluidized catalyst bed depth above riser discharger 4 in reaction vessel 5 to maintain and control the fluidized dense catalyst phase temperature in regeneration vessel 11, and by adjusting the flow rate of oxygen-containing regeneration gas via regeneration gas sparger 13 to the regeneration vessel 11 to provide an oxygen concentration in the flue gas from vent line 15 in the range of from about 1 mol% to about 10 mol%, and preferably from

We claim:

1. In a process for continuous fluidized catalytic cracking of petroleum feedstock wherein a hydrocarbon charge stream is contacted with a zeolitic molecular sieve type catalyst in a reaction zone comprising a substantially vertical riser transport reaction zone discharging at its upper end into the upper portion of a reaction-separation zone wherein products of reaction are separated from partially deactivated catalyst containing coke deposits thereon and said partially deactivated catalyst is withdrawn from said reaction-separation zone and contacted with a stripping medium effecting displacement of occluded and accompanying hydrocarbons from said partially deativated catalyst, stripped catalyst is passed to a regeneration zone wherein a dense phase fluidized bed of said catalyst is contacted at elevated temperature with an oxygen-containing gas effecting combustion of said coke and regeneration of said catalyst, and regenerated catalyst is introduced into the lower portion of said riser transport reaction zone into contact with fresh hydrocarbon charge, the improvement which comprises establishing and maintaining within said reaction-separation zone a fluidized dense phase catalyst bed above the level of said riser discharge, maintaining a substantially constant level of conversion of said petroleum feedstock in said riser transport reaction zone, withdrawing catalyst from said reaction-separation zone at a rate sufficient to maintain said dense phase fluidized bed level of catalyst above said riser transport reaction zone discharge level, supplying oxygen-containing regeneration gas into said regeneration zone in an amount sufficient to consume substantially all of said coke on said catalyst with the production of a flue gas comprising carbon dioxide and oxygen and substantially free from carbon monoxide, detecting the temperature of said fluidized bed of catalyst in said regeneration zone, increasing the level of said fluidized bed of catalyst maintained in said reaction-separation zone when said temperature in said regeneration zone decreases thereby increasing the amount coke deposited on said catalyst, and decreasing said level of said fluidized bed of catalyst in said reaction-separation zone when the temperature in said regeneration zone increases thereby decreasing the amount of coke deposited on said catalyst, and thereby maintaining the temperature of said fluidized bed in said regeneration zone at a level sufficient to ensure substantially complete consumption of coke and carbon monoxide in said regeneration zone and below that at which substantial catalyst deactivation takes place, and discharging from said regeneration zone catalyst substantially free from coke and flue gas substantially free from carbon monoxide.

2. a method according to claim 1 wherein said fluidized bed level in said regeneration zone is maintained substantially constant.

3. A method according to claim 1 wherein said flue gas has a carbon monoxide content of about 500 ppm or less.

4. A method according to claim 3 wherein said carbon monoxide content is about 10 ppm or less.

5. A method according to claim 1 wherein the oxygen concentration in said flue gas is within the range of about 2 to 5 volume percent.

6. A method according to claim 1 wherein said temperature is within the range of from about 1275° F. to about 1450° F.

7. A method according to claim 1 wherein catalyst and products of reaction discharged from the upper end of said vertical riser transport reaction zone are directed downwardly into said reaction-separation zone.

8. A method according to claim 1 wherein said regenerated catalyst has a carbon content of about 0.15 weight percent or less.

* * * * *